United States Patent [19]
Agnone

[11] 3,754,331
[45] Aug. 28, 1973

[54] UNIVERSAL DENTAL EXTRACTION FORCEPS

[76] Inventor: Frank A. Agnone, 327 N. Washington Ave., Scranton, Pa.

[22] Filed: June 12, 1972

[21] Appl. No.: 261,634

[52] U.S. Cl. .................................. 32/62, 32/40
[51] Int. Cl. .............................. A61c 3/10
[58] Field of Search ............. 32/62, 40 R; 81/5.1, 81/418–428 R, 427

[56] References Cited
UNITED STATES PATENTS
2,583,896   1/1952   Siebrandt .................. 81/425 R FOREIGN PATENTS OR APPLICATIONS
468,960   4/1927   Germany ........................ 32/62

Primary Examiner—Louis G. Mancene
Assistant Examiner—J. Q. Lever
Attorney—Robert P. Williams

[57] ABSTRACT

Dental extraction forceps which are adjustable to provide fitted contact with the surface of a tooth include pivotal handles, each having a tooth-engaging jaw. At least one of the tooth engaging jaws carries an adjustable beak which is pivotally connected to the jaw and which has a tooth-engaging surface which can be positively moved into fitted contact with a tooth surface by means of an adjusting screw.

4 Claims, 3 Drawing Figures

Patented Aug. 28, 1973 3,754,331

UNIVERSAL DENTAL EXTRACTION FORCEPS

BACKGROUND OF THE INVENTION

This invention relates to the extraction of teeth during dentistry or oral surgery. The invention more particularly relates to a novel pair of dental extraction forceps.

The extraction of teeth is an ancient art, but it has not been until the mid-19th century that it has been relatively easy to extract teeth without injury to the jaw or to other teeth surrounding the one being extracted. It has been known that the tooth-engaging surfaces of extraction forceps should fit or conform to the tooth being extracted for best results. To this end, forceps have been expecially designed to fit various types of teeth, that is the tooth-engaging jaws of these forceps have been shaped to fit teeth of different types, such as one shape for the relatively flat incisors, another shape for the broad larger molars, and so forth.

The crowns of teeth vary widely in size and shape. They vary in shape and size according to their primary utility, i.e., those used for cutting, the incisors, are flat and relatively sharp, while those used for chewing, the molars, are broad and flat. Moreover, tooth crowns vary in size with the age of the patient. On eruption, the crown of a tooth comprises only 33 to 48 percent of the length of the tooth. As the patient ages, attritive processes such as abrasion mal-occlusion, bruxism, and even normal mastication wear away the tooth enamel, changing the size and shape of the crown. At the same time, the root length remains the same, so that with an older patient, the dentist is at a great disadvantage.

Another important consideration is the fact that the crown surface is enamel, the hardest tissue in the human body, resembling porcelain. The material used to make dental instruments is usually hard steel. Consequently, when an extraction is performed, two hard surfaces must be brought into forceful contact. It often happens that, when the forceps are applied to the crown of the tooth to be extracted, concentrated, unbalanced forces are applied to the tooth and occasionally the tooth crown breaks, leaving the root portion in place and making the job of extracting the root portion extremely difficult. Cost is another serious problem since many different tools have been required.

One solution to these problems has been to provide a pair of forceps with tooth engaging jaws which include beaks which are moveable into a fitted relation with the surface of the tooth. See, for example, the patent to Jacob, U.S. Pat. No. 681,224, issued Aug. 27, 1901 in which a beak is pivotally attached to one or both jaws of a forceps. While this forceps may operate satisfactorily, forceps of this kind have not appeared on the market and have not been used. The reason why such forceps have not been used is not known, but it is believed that even with the pivotal beak of Jacob, force may not be applied evenly to the tooth surface. The mere act of bringing the jaws of the forceps into contact with the tooth will certainly cause the adjustable beak of the Jacob forceps to move into somewhat fitted engagement with the crown of the tooth; however, the force applied to the tooth by the tool is still directed only through the pivot of the movable beak. Consequently, the applied force will be distributed evenly over the tooth surface only if the pivot pin happens to be centrally located with respect to the crown.

SUMMARY OF THE INVENTION

It is an object of the present invention to improve the art of tooth extraction by providing a tool in which the danger of breaking the crown of a tooth is substantially reduced.

It is another object of the invention to provide a pair of dental extraction forceps which can be applied to teeth of many different shapes and sizes, while providing a relatively good fit with each.

These and other objects of the present invention are accomplished by means of dental forceps which have at least one adjustable beak on the tooth-engaging jaws thereof. The adjustable beak is pivoted to turn about an axis which is parallel to the normal axis of pivoting of the handles and a means is provided for positively adjusting the position of the beak around this axis and retaining it in an adjusted position in which it closely fits the surface of the crown of the tooth to be extracted. The present forceps eliminates the need for a variety of different forceps which has heretofore been necessary to accommodate all different shapes and sizes of teeth.

THE DRAWINGS

THE PREFERRED EMBODIMENT

Figure 1:
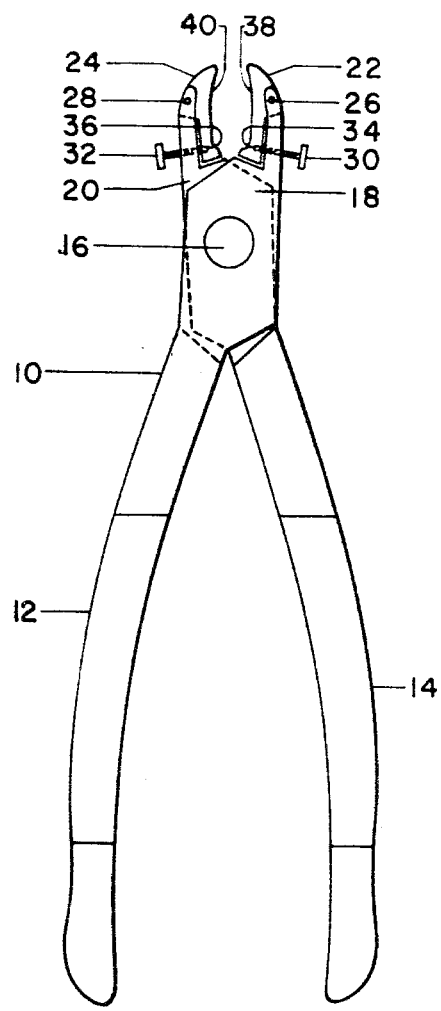
FIG. 1 is a plan view of the present novel dental extraction forceps.

The present novel forceps are indicated in the drawings generally by the reference numeral 10. The forceps 10 are comprised of a pair of handle sections 12 and 14, which may be conventionally shaped and which are connected together for pivotal relative rotation by means of a pin 16. The handle section 12 carries a jaw 18 and the handle section 14 has a jaw 20 on the side of the pivot pin 16 opposite from the handle ends of the handle section 12 and 14. The relative sizes of the handle and jaws relative location of the pivot 16 may all be substantially the same as in conventional forceps.

The novelty in the present forceps lies in the construction of the tooth-engaging parts of the forceps. As illustrated in FIG. 1, the jaws 18 and 20 are each provided with an adjustable tooth-engaging beak, 22 and 24 respectively, which are similarly constructed. The beak 22 on the jaw 18 is pivotally attached to the jaw 18 by means of a pivot pin 26 arranged so that the beak 22 may pivot about an axis which is substantially parallel to the main axis of pivoting of the handle elements 12 and 14 about the pin 16. Similarly, the beak 24 on the jaw 20 is pivotally attached by means of a pin 28. As described thus far, the forceps are much the same as the forceps shown in the Jacob patent refered to above. However, in the present novel forceps, the beak 22 and 24 are positively adjustable with respect to the jaws 18 and 20.

Figure 3:
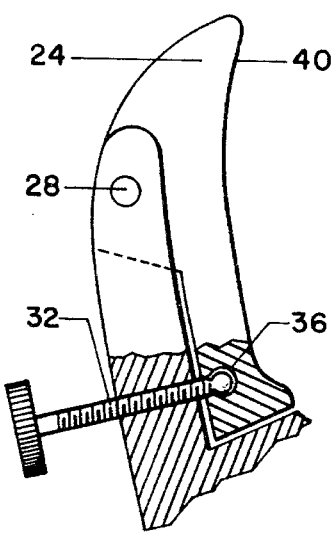
FIG. 3 is an enlarged partial sectional view showing the details of the pivotal beak.
Figure 2:
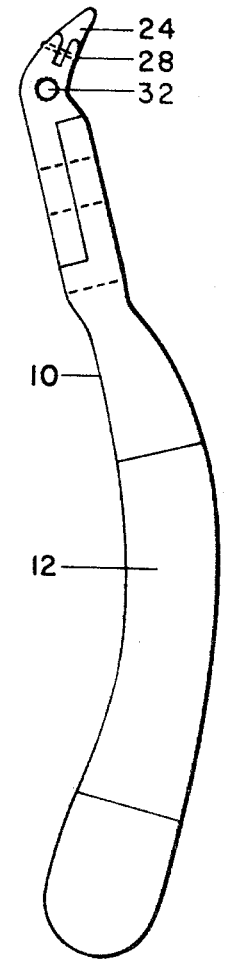
FIG. 2 is a side view of the present novel forceps, illustrating the configuration of the adjustable beak.

The positive adjustment of the beaks 22 and 24 is provided by a pair of adjusting screws 30 and 32. The screw 30 is threadedly engaged with the jaw 18 and extends through the jaw 18 from the outside of the forceps to engage the beak 22 at a location spaced inwardly from the pivot pin 26. At its point of contact with the beak 22, the screw 30 engages the beak 22 by means of a ball and socket joint 34, so that inward and outward movement of the screw 30 will act positively to move the beak 22 about the pin 26. The screw 32 is similarly threadedly engaged with the jaw 20 and engages an inward portion of the beak 24 in a ball and socket joint 36. See especially the partial sectional view of FIG. 3.

The use of the adjustable beak on both of the handle elements 12 and 14 is a preferred construction. The adjustable beak may be used on only one of the handle elements if desired to achieve the improved results of the present invention.

The inner surfaces 38 and 40 respectively, of the beaks 22 and 24 are shaped to accommodate a tooth of average dimension. Differences in the precise shape of various teeth may then be accommodated by the present novel forceps in the following manner.

In using the present novel forceps, the extracting physician first applies the forceps to the teeth in a testing manner to determine what adjustment is required. Having done this, he observes the inner edges 38 and 40 of the beaks 22 and 24 and then manipulates the screws 30 and 32 until each of these surfaces contacts the tooth at as many contact points as is possible. As discussed above, teeth are irregularly shaped, so that the contact between the forceps and the tooth will usually be over a series of spaced apart points. Having thus made the adjustment, the extracting physician may then apply pressure to the handle elements 12 and 14 to grip the tooth, after which he may apply the extracting force.

The adjustment of the beaks 22 and 24 to bring them into contact with as many of the irregular points of contact as is possible for a given tooth results in a distribution of the force applied by the forceps over the surface of the tooth, thus substantially reducing the danger of breaking the crown. In contrast to prior forceps with adjustable beaks, the positive adjustment of the present adjustable beaks provides for stability of the tool and for a relatively even, constant force on the tooth. With these improvements, substantially safer extractions can be performed.

What is claimed is:

1. Dental forceps adjustable to provide a substantial degree of contact with the surface of a tooth comprising pivotally connectedhandles, each terminating in a jaw, at least one of said jaws having a beak having a tooth-engaging surface, means pivotally connecting said beak to said handle for movement about an axis parallel to the pivot axis of said handle, and means acting between said jaw and said beak for positively adjusting the position of said beak with respect to said handle to bring said tooth engaging surface into fitted contact with a tooth.

2. Dental forceps as defined in claim 1, wherein said positive adjusting means comprises a screw threadedly engaged with said jaw and extending into engagement with said beak.

3. Dental forceps as defined in claim 3, wherein said screw engages said beak by means of a ball and socket joint.

4. Dental forceps as defined in claim 3 wherein each of said jaws has a pivotally connected, positively adjustable tooth-engaging beak.

* * * * *